US010329837B2

(12) United States Patent
Grützner (10) Patent No.: US 10,329,837 B2
(45) Date of Patent: Jun. 25, 2019

(54) LATERALLY MOVING SHADE ROLLER TUBE (71) Applicant: AUTO-MOTION SHADE INC., Markham (CA)

(72) Inventor: Hans Grützner, Kehrsatz (CH)

(73) Assignee: AUTO-MOTION SHADE INC., Markham (CA)

(*) Notice: Subject to any disclaimer, the term of this patent is extended or adjusted under 35 U.S.C. 154(b) by 68 days.

(21) Appl. No.: 14/789,850

(22) Filed: Jul. 1, 2015

(65) Prior Publication Data

US 2016/0083998 A1 Mar. 24, 2016

(51) Int. Cl.
E06B 9/08 (2006.01)
E06B 9/44 (2006.01)
E06B 9/50 (2006.01)
B60J 1/20 (2006.01)

(52) U.S. Cl.
CPC ............. *E06B 9/44* (2013.01); *B60J 1/205* (2013.01); *B60J 1/2086* (2013.01); *E06B 9/50* (2013.01)

(58) Field of Classification Search
CPC ........ E06B 9/40; E06B 2009/402; E06B 9/44; E06B 9/42; E06B 9/80; B60J 1/205; B60J 1/2086
USPC .................................................. 160/295, 242
See application file for complete search history.

(56) References Cited

U.S. PATENT DOCUMENTS

| 6,497,267 | B1* | 12/2002 | Azar | E06B 9/42 |
| | | | | 160/188 |
| 9,322,214 | B2* | 4/2016 | Bohlen | E06B 9/88 |
| 2002/0069980 | A1* | 6/2002 | Floyd | B60J 1/205 |
| | | | | 160/370.22 |
| 2009/0283224 | A1* | 11/2009 | Kim | A47H 23/06 |
| | | | | 160/241 |
| 2014/0158312 | A1* | 6/2014 | Townsley | B60J 1/205 |
| | | | | 160/243 |

* cited by examiner

Primary Examiner — Katherine W Mitchell
Assistant Examiner — Jeremy C Ramsey
(74) Attorney, Agent, or Firm — Weise & Arons LLP (57) ABSTRACT A roller shade assembly comprising a roller tube having an inner surface defining an axial bore, a spindle including an outer threaded portion defining a helical groove, the spindle configured to be received in the axial bore of the roller tube for axial movement in the roller tube at one end roller tube and at least one tracking element operatively associated with the roller tube, the at least one tracking element configured for riding in the helical groove to convert axial rotation of roller tube into axial movement of the roller tube on the support tube. The tracking element engages the helical groove from a position more proximal to one end of the roller tube. The starting axial position of the roller tube in relation to the support tube is configured to be adjustable by manually rotating the spindle without rotating the support tube.

19 Claims, 8 Drawing Sheets

LATERALLY MOVING SHADE ROLLER TUBE

FIELD OF THE INVENTION

The present invention relates to roller shades and in particular to a roller shade assembly adapted to provide for lateral movement of the shade for the purpose of covering an irregular shaped window, for example a window of the type that may be found in recreational and other vehicles.

BACKGROUND OF THE INVENTION

Recreational and other vehicles are sometimes outfitted with irregular shaped windows, for example trapezoidal windows. Existing roller shades for trapezoidal windows are designed to enable the roller tube on which the shade is wound to move laterally over a support tube so that the shade can move laterally with the roller tube to fully cover the bottom of the window. For example, lateral movement of the roller tube may be particularly important when the shade is designed to occupy a confined space such as when the trapezoidal window is at the front of a vehicle, where it may be adjacent and orthogonal to an angled windshield. The shade may be shaped to be closely fitted to the window, for example in the case of a trapezoidal window, using a shade cut in a matching trapezoidal shape. However, even with a shade of matching shape, without being able to move laterally, the shade would not fully cover the window at various heights over the range of vertical movement of the shade. For example, if the roller tube did not move laterally there would either be a gap in coverage near at the corner of the window immediately adjacent the windshield or the shade could not be lifted fully without running up against the windshield.

To avoid gaps in coverage using a laterally moving shade, the lateral starting position of the shade may need to be adjusted on-site.

Furthermore, depending on the interior design of the vehicle cabin, the mounting bracket might be organized to fit behind a valence. To make the bottom of the shade accessible from beneath the valence, particularly in the case of manually operable shade, it is desirable to be able to set an upper limit of movement for the bottom end of the shade, when the shade is installed, for example, so that the bottom end of shade does not disappear behind the valence, when fully retracted.

Existing trapezoidal roller shade designs are not well-suited for such upper limit or lateral position adjustments. Since the shade is designed to move laterally when descending, lateral movement of the roller tube is preferably designed to be linked to its rotation about the axis of the roller tube. In existing designs, a spindle having a helical exterior groove is used to convert the rolling motion about the axis of the roller tube into lateral movement. This is accomplished by using an internally threaded spindle nut which travels axially (along the axis) with respect to the external thread of the spindle. Rotation of the spindle nut about the axis of the spindle is rotationally linked to the roller tube so that the two co-rotate. Since the spindle nut rotates together with the roller tube, the spindle nut travels axially over the spindle to convert the rotation of the roller tube into axial movement of roller tube over a support tube.

In the afore-described prior art design, the spindle and spindle nut are housed within a hollow axial bore in the support tube which is visible via a long narrow aperture or slot in the wall of the support tube. The roller tube is secured to the spindle nut with a set screw receivable in an exterior aperture in the roller tube and a corresponding exterior threaded aperture in the spindle nut. This threaded aperture in the spindle nut (there may be more than one such aperture) is visible through this slot in the support tube however since the most of the length of the support tube is located in the cylindrical hollow of the roller tube, except the threaded aperture, the slot and the spindle nut are normally concealed by the roller tube. This makes it difficult to adjust upper limit of movement of the bottom end of the shade without disassembling the roller shade assembly.

Lateral adjustment of the starting position of the roller tube on the support tube necessitates removal of the set screw to adjust the axial position of the spindle nut in relation to the support tube in a manner that axially re-aligns the apertures in the roller tube and spindle nut. However, this adjustment concomitantly adjusts the upper limit of movement of the bottom end of the shade, as explained hereafter, which either causes the bottom end of the shade to disappear behind the valence or ends the course of its upward travel prematurely.

Adjustment of the position of the roller tube relative to the support tube, on site, is accomplished by rotating a wheel located at one end of the roller shade assembly near the mounting bracket. The wheel rotates co-axially with the spindle and is rotationally linked to the spindle to co-rotate therewith and rotate of the spindle about its own axis. Rotation of this adjustment wheel also co-rotates a threaded shaft which is linked to the spindle. Co-rotation of the threaded shaft concomitantly adjusts the upper limit of the bottom end of the shade by causing axial movement of an internally threaded axially driven element configured to rotate on the threaded shaft in the manner of a nut. This alters the distance of the axially driven element from the position of a stop element against which the axially driven element abuts at the end of its course of travel over the threaded shaft, this distance in turn defining the maximum number of revolutions of the roller tube.

Accordingly, in prior art designs, adjustment of the axial position of the spindle nut using an adjustment wheel undesirably adjusts the upper limit of movement of the bottom end of the shade. This is a cumbersome and ineffective solution for adjusting the starting axial position of the roller tube on the support tube and the maximum distance of upward travel of the bottom end of the shade, when the shade is being installed.

Accordingly, there is a need for a less cumbersome and more effective manner of making such adjustments in laterally moving shades.

SUMMARY OF THE INVENTION

In one embodiment, the present invention facilitates adjusting at least one of the starting axial position of the roller tube on the support tube and optionally also the maximum distance of upward travel of the bottom end of the shade by dispensing with the need for a spindle nut and redesigning the spindle to receive a tracking element and to also sit outside the support tube. This obviates both the need to align the aperture in the roller tube with an aperture in the spindle nut. The tracking element extends radially into the axial cylindrical bore in the roller tube to ride in a suitable designed exterior groove in the spindle.

Optionally, adjustment of the starting axial position of the roller tube on the support tube and the maximum distance of upward travel of the bottom end of the shade are dissociated into separate steps associated with different structural features, with one step unaffected by the other.

To adjust the starting axial position of the roller tube on the support tube, the spindle, extending axially from and accessible outside the support tube, is rotated to displace the roller tube axially without rotating the roller tube. The spindle rotates freely with respect to the support tube to uncouple lateral movement and axial rotation of the roller tube (rotation of roller tube about its axis). An anti-rotation feature, optionally in the form of a locking element may then be employed to fix the rotational position of the spindle relative to rotational movement of the roller tube so that the spindle functions to convert rotation of the roller tube into an axial travel of the roller tube.

Optionally, the spindle is connected to an actuator which is designated to adjust the upper limit of travel of the shade, optionally in the form of a manually rotatable adjustment wheel. The adjustment wheel is configured to rotate axially and the locking element may be connected to the adjustment wheel to rotate the spindle therewith. The adjustment wheel rotates a threaded shaft and at least one axially driven element, as described below, and resists rotation to keep the spindle from rotating when the height of the shade is adjusted unless the adjustment wheel is deliberately rotated with modest effort.

Optionally, adjustment of the maximum distance of upward travel of the bottom end of the shade does not affect the starting axial position of the roller tube on the support tube. Even though rotating the adjustment wheel to adjust the upper limit of travel of the shade rotates the spindle and the roller tube in tandem therewith, the relationship between axial and rotational position of the roller tube is pre-set by adjusting the starting position of the roller tube on the support tube and is maintained thereafter by the locking element. Thereafter, the relationship between axial and rotational movement is determined by the pitch of an external helical groove in the spindle. Hence the lateral starting position of the roller tube is not normally altered without disengaging the locking element.

Thus, according to one embodiment, the invention is directed to a roller shade assembly comprising: a) a roller tube having an inner surface defining an axial bore; b) a spindle including an outer threaded portion defining a helical groove, the spindle configured to be received in the axial bore of the roller tube for axial movement therein; and c) at least one tracking element operatively associated with the roller tube, the at least one tracking element configured for riding in the helical groove to convert axial rotation of roller tube into axial movement of the roller tube on the support tube.

The starting axial position of the roller tube in relation to the support tube is configured to be adjustable by manually rotating the spindle without rotating the support tube.

This lateral adjustment feature is preferably configured to adjust the starting axial position of the roller tube in relation to the support tube by rotating the spindle without adjusting the upper limit of travel of the bottom end of the shade.

The roller shade assembly optionally comprises an upper limit adjustment feature for adjustment the maximum height of the bottom end of the shade.

In operation of the roller shade the spindle is normally coupled for co-rotation to at least one component of the upper limit adjustment feature. This component is rotatable, optionally, via an adjustment wheel that is manually rotated to adjust the upper limit of the bottom edge of the shade. Preferably, the lateral adjustment feature includes a disengageable coupling feature disengagement of which uncouples rotation of the spindle from rotation of this component. The spindle, for example, is directly coupled to the adjustment wheel. Uncoupling of the spindle allows the spindle to be rotated independently of this component (e.g. the threaded shaft portion of the support shaft assembly, as explained in more detail below).

Optionally, the at least one tracking element is at least one pin that extends radially from the outer surface of the roller tube into the axial bore of the roller tube and into the helical groove. The tracking element optionally engages the helical groove from a position proximal to one end of the roller tube.

Optionally, the pin is configured to be removable, wherein removal of the pin enables the starting axial position of the roller tube on the support tube to be adjusted without axially rotating the roller tube.

The roller shade assembly optionally includes an anti-rotation feature for preventing rotation of the spindle when the roller shade is operated.

The starting axial position of the roller tube in relation to the support tube is configured to be adjustable by manually accessing the spindle from a position external to the roller tube. In this manner, the spindle may be rotated without rotating the roller tube.

The anti-rotation feature optionally comprises a spindle locking element.

The lateral starting position of the roller tube on the support tube is optionally adjustable by directly rotating the spindle when the locking element is disengaged, engagement of the spindle locking element configured, in operation, to prevent the spindle from rotating when the roller tube is axially rotated such that axial rotation of roller tube is converted into axial movement of the roller tube on the support tube.

The roller shade assembly comprises a support structure including at least one support shaft assembly for co-axially supporting the support tube and the spindle on a roller shade assembly mounting bracket.

The roller shade assembly of the present invention may be of the type operated manually which includes a spring-driven retraction mechanism or it may be operated by a motor, for example a tubular motor, which drives the support tube and the roller tube therewith. In the embodiments presented herein, the latter mechanical features are wholly independent of the structural features of the invention required to facilitate adjusting the starting axial position of the roller tube on the support tube, and optionally the maximum distance of upward travel of the bottom end of the shade. Variations pertaining to the mechanism of retraction and implementing motorized operation are known to those skilled in the art and do not form part of the invention.

Thus according to one embodiment, the present invention is directed to a roller shade assembly comprising: a roller tube having an inner surface defining an axial bore, a spindle including an outer threaded portion defining a helical groove, the spindle configured to be received in the axial bore of the roller tube for axial movement therein, at least one tracking element operatively associated with the roller tube, the at least one tracking element configured for riding in the helical groove to convert rotation of roller tube about its own axis into axial movement of the roller tube on the support tube and a support shaft assembly configured for co-axially supporting the roller tube and the spindle on a roller shade assembly mounting bracket and a lateral adjustment feature configured for rotating the spindle independently of the roller tube and the support shaft assembly, wherein the lateral adjustment feature adjusts the axial position of the roller tube in relation to the support shaft assembly without changing the upper limit of movement of the bottom end of the shade.

Optionally, a starting axial position of the roller tube in relation to the support tube is configured to be adjustable by manually rotating the spindle without rotating the support tube, the roller shade assembly optionally further comprising an upper limit adjustment feature for adjustment the maximum height of the bottom end of the shade, optionally the spindle, in operation, co-rotationally coupled to at least one component of the lateral adjustment feature which is rotatable to adjust the upper limit of the bottom edge of the shade, the lateral adjustment feature optionally including a disengageable coupling feature which is disengaged to uncouple rotation of the spindle from rotation of this component.

Optionally the at least one tracking element is at least one pin that extends radially from the outer surface of the roller tube into the axial bore of the roller tube and into the helical groove; the tracking element optionally riding in the helical groove from a position proximal to one end of the roller tube.

The roller shade assembly optionally includes an anti-rotation feature for preventing rotation of the spindle when the roller shade is operated; the anti-rotation feature optionally comprising a spindle locking element which optionally corresponds structurally to the disengageable coupling feature; the starting axial position of the roller tube in relation to the support tube optionally configured to be adjustable by manually accessing the spindle from a position external to the roller tube, optionally from one end of the roller shade assembly proximal to a mounting bracket; the lateral starting position of the roller tube on the support tube optionally adjustable by directly rotating the spindle when the locking element is disengaged, engagement of the spindle locking element configured, in operation, to prevent the spindle from rotating when the roller tube is axially rotated such that axial rotation of roller tube is converted into axial movement of the roller tube on the support tube.

According to another embodiment, the present invention is directed to a roller shade assembly, comprising:
a) A roller tube configured to support a shade, wherein the roller tube is hollow and includes an outer surface for mounting the shade and an inner surface defining an axial bore which extends through both ends of the roller tube;
b) A support tube disposed in the axial bore of the roller tube for receiving and supporting the roller tube, the roller tube and the support tube, in operation, respectively configured for co-rotation and for sliding axial movement of the roller tube on the support tube;
c) A spindle extending axially from a first end of the support tube and configured to be received in the axial bore of the roller tube for axial movement within the axial bore of the roller tube, the spindle including an outer threaded portion defining a helical groove;
d) At least one tracking element operatively associated with the roller tube, the at least one tracking element configured for riding in the helical groove to convert rotation of roller tube about its axis into axial movement of the roller tube on the support tube, at least an operative portion of the helical groove located outside the support tube, the tracking element engaging the helical groove outside the support tube from a position proximal to one end of the roller tube;
e) A support structure including at least one support shaft assembly for co-axially supporting the support tube and the spindle on a roller shade assembly mounting bracket.

The roller shade assembly preferably includes a lateral adjustment feature for adjusting a starting axial position of the roller tube in relation to the support tube.

The lateral adjustment feature is preferably configured to adjust the starting axial position of the roller tube in relation to the support tube by rotating the spindle without adjusting the upper limit of movement of the bottom end of the shade.

The lateral adjustment feature preferably configured for rotating the spindle independently of the roller tube and at least a portion of the support shaft assembly (for example, the adjustment wheel and the threaded shaft portion of the support shaft assembly) such that the lateral adjustment feature provides for adjustment of the axial position of the roller tube in relation to the tube without changing the upper limit of movement of the bottom end of the shade.

Optionally, in operation of the roller shade, the spindle is co-rotationally coupled to at least a portion of the support shaft assembly and the roller tube is co-rotationally uncoupled from the spindle and wherein the lateral adjustment feature includes a disengageable coupling feature for coupling rotation of the spindle to said portion of the support shaft assembly, wherein disengagement of the coupling feature is organized to adjust the starting axial position of the roller tube without rotating the roller tube and without changing the upper limit of movement of the bottom end of the shade.

The roller shade assembly optionally includes an upper limit adjustment feature for adjusting the upper limit of movement of the bottom end of the shade.

A roller shade assembly preferably includes a lateral adjustment feature for adjusting a starting axial position of the roller tube in relation to the support tube, the starting axial position of the roller tube in relation to the support tube adjustable by manually rotating the spindle without rotating the roller tube.

Optionally, the at least one tracking element is at least one pin that extends radially from the outer surface of the roller tube into the axial bore of the roller tube and into the helical groove.

The roller shade assembly optionally comprises an anti-rotation feature (which optionally corresponds structurally to the disengageable coupling feature) for resisting axial rotation of the spindle in response to axial rotation of the roller tube, the spindle rotationally mounted in relation to the support tube to permit axial rotation of the spindle independently of axial rotation of the support tube, the starting axial position of the roller tube in relation to the support tube configured to be adjustable by manually rotating the spindle from a position external to the support tube without rotating the support tube.

Optionally, the anti-rotation feature comprises a spindle locking element, the lateral starting position of the roller tube on the support tube adjustable by directly rotating the spindle when the locking element is disengaged, engagement of the spindle locking element configured, in operation, to prevent the spindle from rotating when the roller tube is axially rotated such that axial rotation of roller tube is converted into axial movement of the roller tube on the support tube.

Optionally, the spindle locking element is a fastener configured for fastening the spindle to a portion of the support shaft assembly, the fastener connected to the spindle in a location that is axially remote from axial path of travel of the roller tube on the spindle (optionally at an end of the roller shade assembly proximal to the mounting bracket) and accessible when the roller shade assembly is supported on the mounting bracket.

Optionally, the roller shade assembly includes an upper limit adjustment feature configured to adjust the upper limit of the bottom edge of the shade.

Optionally, the upper limit of the bottom edge of the shade is adjustable without adjusting the lateral starting position of the roller shade on the support tube.

Optionally, the upper limit of the bottom edge of the shade is adjustable without rotating the roller tube.

Optionally, the upper limit adjustment features includes:
a) an actuator;
b) an externally threaded shaft configured to rotate axially when driven by the actuator;
c) a stop element positioned proximal to one end of the threaded shaft;
c) an internally threaded axially driven element driven by axial rotation of the externally threaded shaft, the axially driven element, in operation of the roller shade, configured to move axially towards the stop element along the threaded shaft, as the shade is raised, the actuator organized modify the distance of the axially driven element to the stop element, the modified distance in turn defining a modified maximum number of revolutions of the roller tube.

Optionally, the actuator is an axially rotatable wheel that is configured to be manually rotatable when the roller shade assembly is mounted on the mounting bracket.

Optionally, the spindle locking element is configured to be fastened to the axially rotatable wheel.

Optionally, the support shaft assembly includes a spring-operated shade retraction mechanism.

Optionally, the support shaft assembly includes a spring-operated shade retraction mechanism, wherein the upper limit of the bottom edge of the shade is adjustable without de-tensioning the spring.

Optionally, the roller shade assembly comprises a motorized drive system configured for axially rotating the support tube.

Optionally, the motorized drive system includes a motor operatively connected to an axially rotatable drive shaft and an axially rotatable coupling element (alternatively referred to as linkage element) configured to co-rotate the support tube, the coupling element attached to drive shaft for co-rotation therewith.

Optionally, the motorized drive system is configured to be housed in axial bore in the support tube.

Optionally, the exterior surface of the support tube comprises at least one longitudinally-oriented channel extending across at least a portion of the exterior of the support tube, and wherein the inner surface of the roller tube includes at least one slidable element configured to ride linearly in the channel to guide axial movement of the roller tube on the support tube.

Optionally, the at least one slidable element is a set of linearly aligned pins that extend radially from the outer surface of the roller tube into the axial bore of the roller tube and into the channel, the set of pins configured to ride axially in the channel and to cause the roller tube and the support tube to co-rotate about a common axis.

Optionally, the channel on the exterior of the support tube defines a ridge projecting radially into the interior of the support tube, the coupling element including at least one slot that is keyed to the ridge such that axial rotation of the coupling element drives the support tube.

Alternatively, the coupling element comprises one or more ridges and the inner surface of the support tube comprises matching channels that provide for co-rotation.

It will be appreciated that components of the roller shade assembly that are linked for co-rotation may be keyed to one another (with complementary profiles of any type) or linked in varied manners known to persons skilled in the art. Although, in the various embodiment of the invention described herein the parts are linked for co-rotation about a common axis, rotation about parallel axes may serve the same function. The actuator, exemplified as a wheel, may operate by rotating a wheel about a non-parallel axis and may use other forms of manual or motorized motion that are mechanically converted into rotation of a rotationally operated part.

Optionally, the motorized drive system is configured to be controlled by a remote control device.

BRIEF DESCRIPTION OF THE FIGURES

Embodiments of the invention will now be described with reference to the accompanying drawings, in which.

DETAILED DESCRIPTION OF PREFERRED EMBODIMENTS

The term "axial" means along an axis running over the length of the roller tube, support tube and/or spindle. These elements are arranged "longitudinally" i.e. along the length of the assembly between the two end faces of mounting brackets located at either end of the assembly. The term "axial rotation" is used to refer to rotation of a particular component about its axis whereas the term "axial" in the context of axial movement or travel is used to refer travel along the axis of the roller shade assembly and in particular along the axis of the co-axially aligned roller tube and support tube. Thus the roller shade, support tube, the adjustment wheel as well as other parts of the support shaft assembly are described as rotating "axially", whereas the roller tube is also described as moving "axially" i.e. laterally over the support tube; and the interiorly threaded axially driven element is described as moving or driven to travel axially, by rotation of the threaded shaft.

Figure 1:
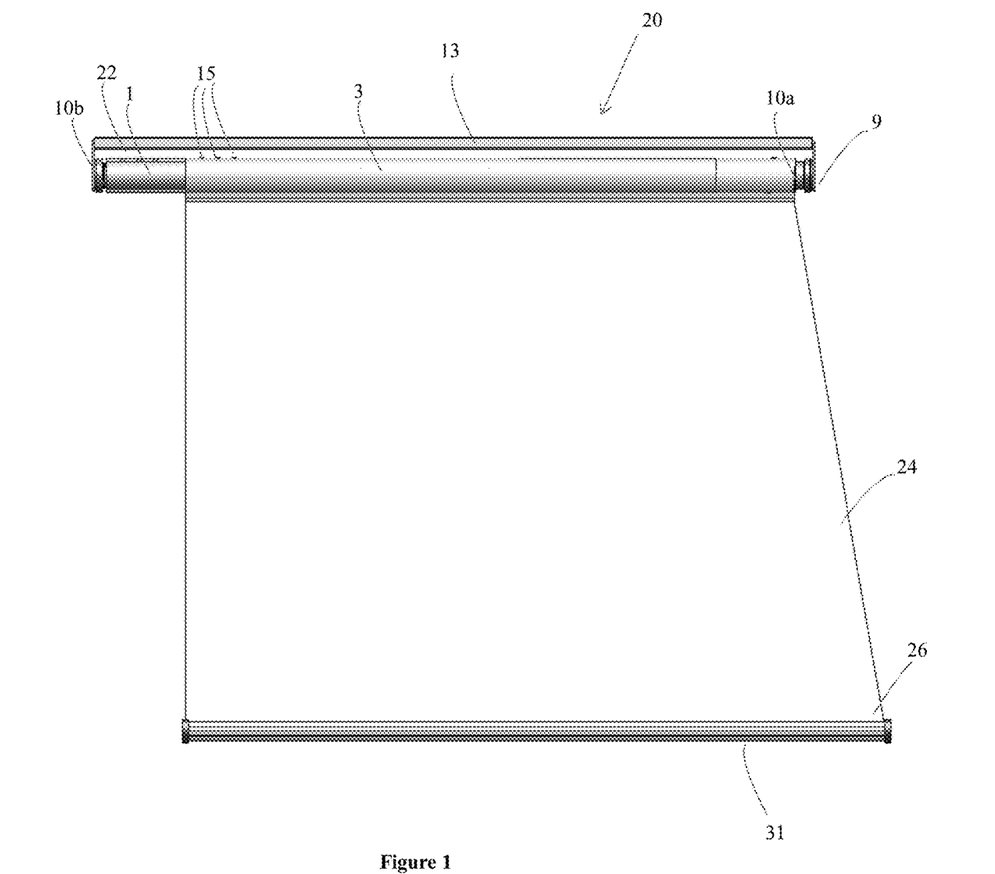
FIG. 1 is a front elevation of one embodiment of a roller shade assembly according to the invention, showing the shade in a lowered position.
Figure 2:
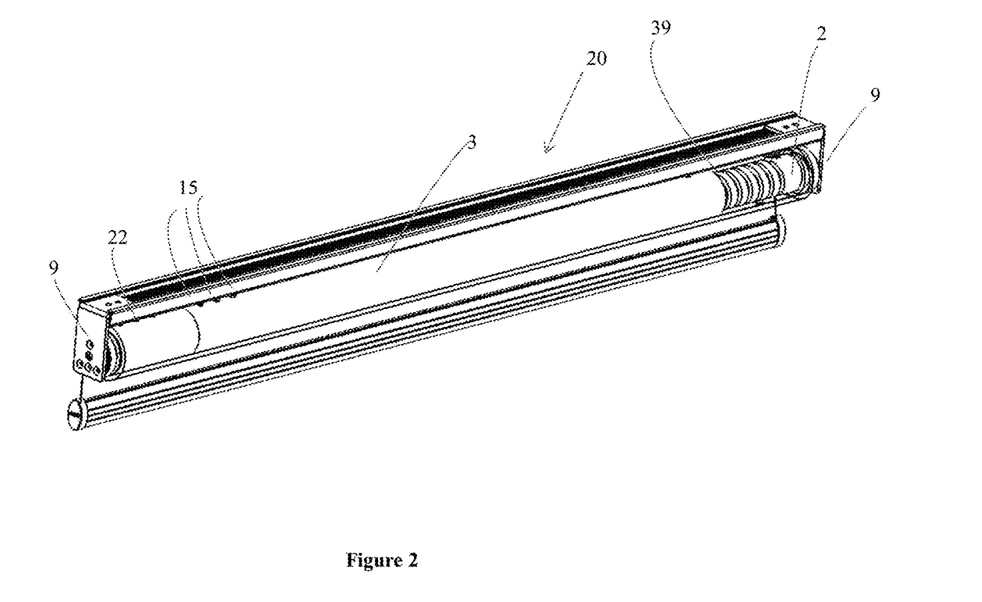
FIG. 2 is a perspective view of one embodiment of a roller shade assembly according to the invention, showing the shade in a raised position.

As best seen in perspective in FIG. 1, roller shade assembly 20 comprises a cylindrical roller tube 3 (better seen in the exploded view in FIG. 3) which is configured for slidable axial movement over a cylindrical support tube 1. As seen in FIG. 1, especially when viewed together with FIG. 2, when fully lowered, the trapezoidal shade 24 and roller tube 3 are positioned toward the right side of the roller shade assembly. In FIG. 2, showing the shade 24 in a raised position, the shade 24 and roller tube 3 are positioned on the left side of the roller shade assembly. It will be appreciated that the shade can be constructed so that the spindle 2 (first seen in FIG. 2) and the angled corner 26 of the shade 24 are on the left side and so that the shade moves from right to left when lowered. Bar 31 located at the bottom end of the shade serves as a weight and a means for grasping the shade to manually lower and manually initiate retraction of the shade 24.

As best seen in FIG. 2, the mounting bracket comprises a rail and angular brackets 9. Wheels 10a and 10b are rotatably and frictionally mounted so that they can be rotated with input of modest energy to overcome the friction.

Figures 3, 3A:
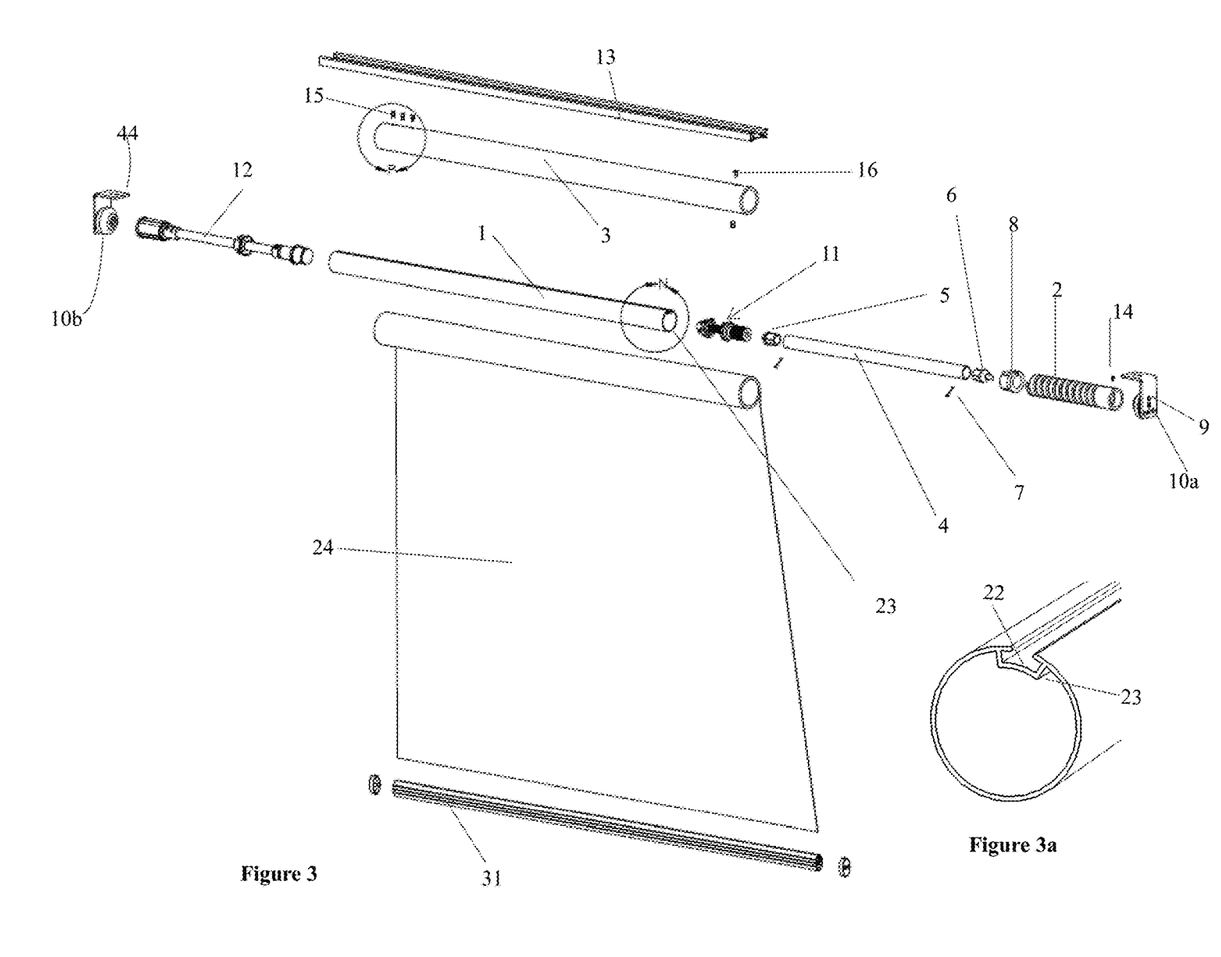
FIG. 3 is an exploded perspective view of a roller shade assembly according to one embodiment of the invention.
FIG. 3a is a detailed perspective view of a component of the roller shade assembly according to the embodiment of the invention shown in FIG. 3.
Figure 4:
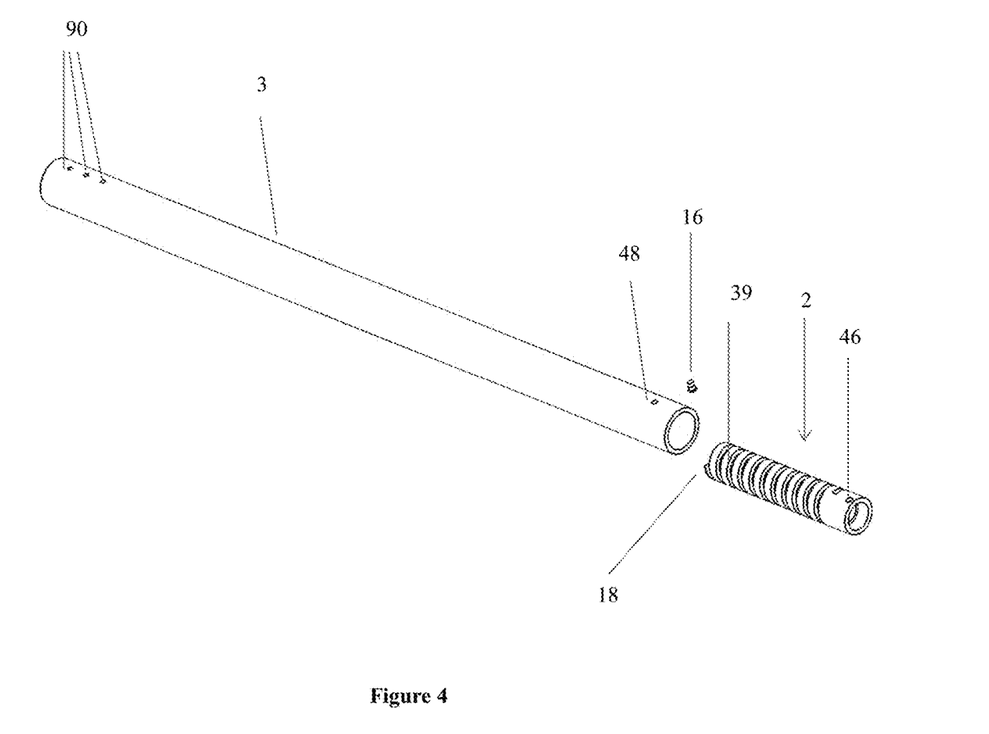
FIG. 4 is a perspective view of the roller tube and spindle in isolation according to one embodiment of the invention.

As most easily seen in FIGS. 3 and 4, roller tube 3 is keyed via a slidable element, for example linearly aligned pins 15 (residing in apertures 90 in the roller tube), to ride in a longitudinally-oriented linear channel 22 (best seen in FIG. 3a) integrally formed in the outside of support tube 1. The pins 15 also serve to co-rotationally link the support tube and the roller tube (co-rotational linkage elements) to cause the roller tube 3 and the support tube 1 co-rotate.

A spindle 2 with an external threaded portion defining a helical groove 39 extends axially from one side of the support tube 1. Conveniently, the spindle at least partially projects out of the roller tube 3, at least when the shade is raised. The spindle 2 is preferably at least partially outside the support tube 1 for ease of access of a disengageable locking element, disengagement of this element enabling the axial starting position of the spindle relative to the roller tube 3 to be adjusted without rotating the roller tube. In this context, it is conveniently located near one end of the roller shade assembly so that this disengageable element is at one end of the assembly and most readily accessed irrespective of the rotational position of roller tube. The spindle 2 is optionally co-axially mounted (with respect to the axis roller tube) and is conveniently of a diameter in which a short tracking element projecting through roller tube extends radially into the groove to convert axial rotational of the roller tube in axial movement of roller tube. Spindle 2 is thus configured to be slidably receivable in the roller tube and to rotate freely in relation to the support tube against support tube cap 8 which cap is optionally keyed to the support tube 1 to ensure a secure fit and optionally to resist rotation as a consequence of friction generated by rotation of the roller tube 3 against the spindle 2. The spindle 2 and cap 8 are suitably made of a thermoplastic material, for example a material characterized by high stiffness, low friction and superior dimensional stability such as polyoxymethylene (POM) which is sold, for example, under the name Delrin™. Among other advantages, such a material allows the cap 8 to rotate with minimal friction against the spindle.

In one embodiment, the roller tube 3, support tube 1 and spindle 2 are configured to be hollow, each having respective axial bores which are co-axially aligned and configured to slidably receive a support shaft assembly. The support shaft assembly is configured to suspend the roller tube assembly on a mounting bracket comprising mounting rail 13 and angular brackets 9 located at both ends of the mounting rail. Wheels 10a and 10b are located at the ends of the support shaft assembly and are provided with slots 44 (visible in wheel 10b in FIG. 3; see also FIG. 8) to suspend the other components of the support shaft assembly. In the non-motorized embodiment of the roller shade assembly, the slots are conveniently rectangular so that wheels 10a and 10b are co-rotationally linked to other elements of the support shaft assembly. Wheels 10a and 10b are conveniently both configured to resist axial rotation, for example frictionally, since each wheel is configured to serve at least one second respective function, as described hereafter, aside from suspending the support shaft assembly, a function optionally served by resisting rotation.

Wheel 10b optionally serves as a tensioning wheel to tension a torsionally mounted spring (not shown) so that the roller tube is retractable. Wheel 10a adjusts the upper limit of travel of the shade 24 but also forms part of an anti-rotation feature, for example, as a location of attachment of a locking element to lock the position of the spindle in relation to support shaft assembly, thus allowing the spindle to be sufficiently rotationally fixed relative to axial rotation of the roller tube. It follows that these respective functions require a proportionate ability to resist axial rotation.

Figure 7:
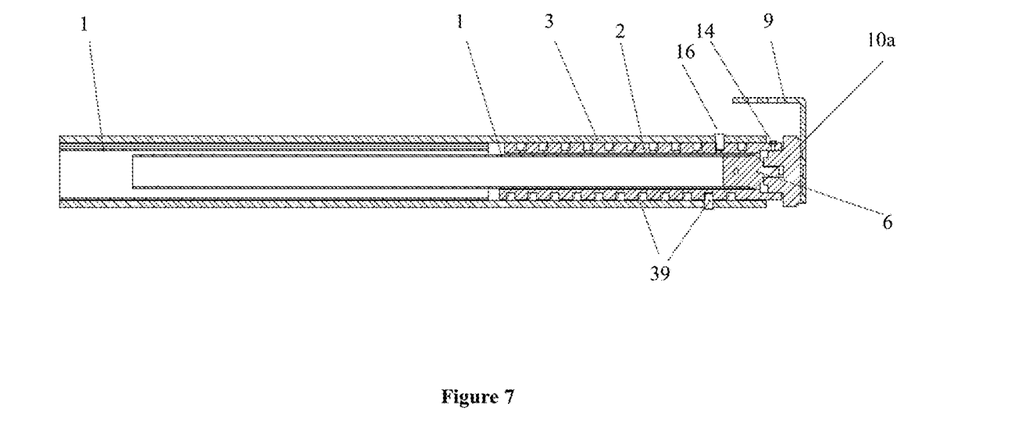
FIG. 7 is a cross-sectional view of one end of the roller shade assembly in the embodiment shown in FIG. 6 comprising components of the assembly providing the lateral adjustment feature according to one embodiment of the invention.

The lateral travel feature which is important for operation of the invention will now be described with reference an embodiment of the invention as best seen in FIGS. 4 and 7. Components generating axial sliding movement of the roller tube 3 on support tube, in operation of the roller shade, include spindle 2 and a tracking element, which is exemplified by pin 16. Pin 16 is located in the roller tube above spindle 2. It is inserted into aperture 48 in the roller tube 3. In particular, it extends securely from the outer surface of the roller tube 3 into the axial bore of the roller tube to ride in a helical groove 39 in spindle 2. Spindle 2 is optionally configured so the track formed by helical groove 39 is open at one end at 18, thereby allowing the spindle to be conveniently be "screwed in" to the roller tube 3 when pin 16 is in place.

As mentioned above, lateral adjustment of the starting position of the roller tube is required to ensure that there are no gaps in covering the bottom angled corner of a trapezoidal window. This starting position corresponds to the maximum upper position of the bottom end of the shade. In operation, the roller tube will move axially in one direction from that starting position so that the angled corner 26 of the shade fully covers the angular corner of the window. The roller tube preferably moves sufficiently in an axial direction to be able to provide this coverage.

An anti-rotation feature, optionally in the form of locking element 14 optionally takes the form of a fastener which is inserted into aperture 46 in spindle 2. In one embodiment, the fastener 14 is conveniently a self-taping screw which taps into adjustment wheel 10a to co-rotationally affix spindle 2 to adjustment wheel 10a. The choice of a self-tapping screw is advantageous so that the coupling end of fastener 14 does have to be aligned with a pre-existing aperture in the adjustment wheel 10 and a new hole can be burrowed when re-fastening. Spindle 2 is not rotationally fixed at its opposite end with respect to the end cap 5 of support tube 1 which preferably has an end face configured to minimize any rotationally generated friction with respect to the spindle 2. When this locking element 14 is disengaged (unscrewed) from the aperture which is has burrowed it allows spindle 2 to now rotate freely at both ends. Rotation of the spindle drives the roller tube 3 axially into an adjusted position which redefines its starting position when pin 16 is in place to drive the roller tube 3 axially. This is accomplished without rotating the roller tube 3 so that lateral positioning of the roller tube 3 is uncoupled from its rotational position. In this manner, the lateral adjustment feature operates independently of the "upper limit" adjustment feature described below. As pin 16 is designed to fit snugly in aperture the roller tube it is preferable that uncoupling of the rotational and axial positions of roller tube 3 be accomplished using a dedicated locking feature. However, it will be appreciated, that removal of pin 16, at least in principle, may also serve to disassociate the lateral and upper limit adjustment features.

A spring biased retraction feature is provided by a sub-assembly 12, which sub-assembly is optionally housed within the end of the support tube 1, opposite the spindle-side of the support tube. This mechanism is common to many conventional roller shades and does not constitute part of the invention. Typically, this retraction feature includes a torsion spring and a rotationally actuated lock feature which is configured so that the lock is engaged when downward motion of the shade is arrested and disengaged when the shade is jiggled downwardly to disengage the locking element and invite retraction. The torsion spring is coupled to at least one component of the sub-assembly that co-rotates with the roller tube 3, so that downward motion of shade tensions the spring. Wheel 10b comprises a rectangular aperture 44 that is keyed to a component of the sub-assembly which tensions the spring when axially rotated in one direction and resists axial rotation to prevent de-tensioning of the torsion spring.

Figure 5:
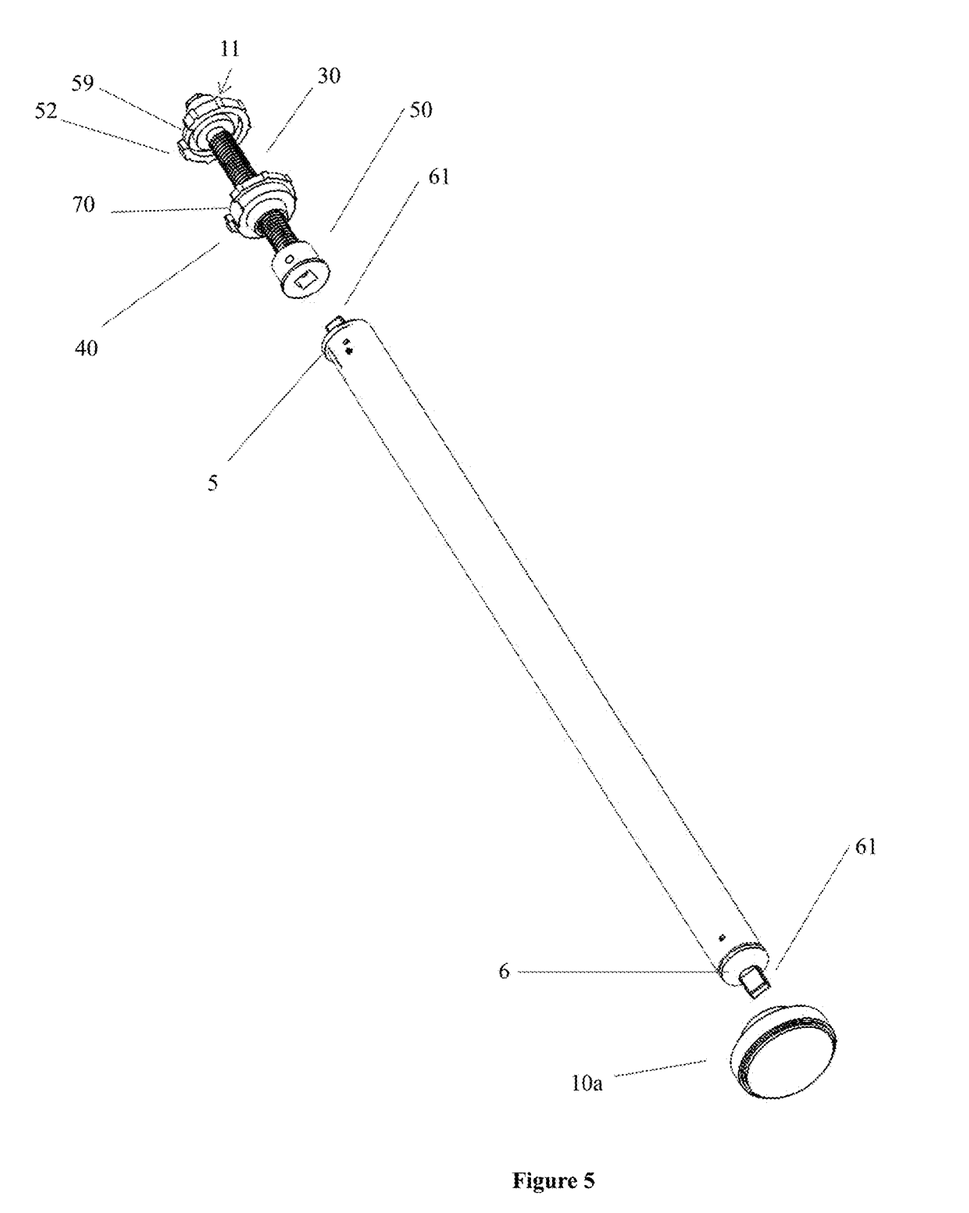
FIG. 5 is a perspective view of components of the upper limit adjustment feature according to one embodiment of the invention.

As best seen in FIG. 5, roller shade assembly optionally includes an upper limit adjustment feature for adjusting the upper limit of travel of the bottom end of shade 24. Components providing the upper limit adjustment feature include an actuator (served by wheel 10a), an externally threaded shaft 30, a stop element 50 positioned proximal to one end of the threaded shaft 30 and an internally threaded axially driven element 40 configured to rotate on threaded shaft in the manner of a nut. Actuator 10a is rotationally linked to tube 4 via rectangular key 61 and is organized modify the distance of the axially driven element 40 to stop element 50, the modified distance in turn defining a modified maximum number of revolutions of roller tube 3. Limit element 52 delimits the maximum distance that axially driven element 40 can move from stop element 50 and at least principle, assuming the length of the shade is not controlling, defines the maximum extent to which the shade can be lowered. Limit element 52 is not internally threaded and inasmuch as it is conveniently keyed via slot 59 to an internally projecting longitudinally oriented linear ridge in support tube 1, rotates freely in relation to threaded shaft without affecting the operation of the upper limit adjustment feature.

Upper limit adjustment of the bottom of the shade will now be further described with reference to FIGS. 3 and 5.

As described with referenced to FIG. 3, channel 22, creates, in a converse-profile, a longitudinal internal ridge 23 on the inside of support tube 1. Longitudinal ridge 23 preferably has at least a partially angular profile which, from the standpoint of implementing co-rotation, serves as a key in relation to a slot 70 of matching profile in the axially travelling internally threaded element 40.

Integrally formed rectangular slot 44 (not seen in FIG. 5) in adjustment wheel 10a is keyed to a shaft 4 to rotationally drive shaft 4, about the longitudinal axis of the support shaft assembly. The components driven by adjustment wheel 10a include shaft 4 and threaded shaft 30. End caps 5 and 6 of shaft 4 define terminal rectangular "key" portions for co-rotationally linking adjustment wheel 10a and threaded shaft 30. As explained below, depending on the direction of rotation of adjustment wheel 10a, threaded shaft 30 will cause axially driven element 40 to move axially towards or away from stop element 50.

Because threaded shaft 30 rotates axially independently of support tube 1 and roller tube 3, and since axially driven element 40 is keyed to support tube 1 via channel 70, axial co-rotation of adjustment wheel 10 and threaded shaft 30 causes internally threaded axially driven element 40 to move axially. Similarly, because threaded shaft 30 rotates axially, independently of support tube 1 and roller tube 3, axial rotation of adjustment wheel 10a does not co-rotate roller tube 3 and the upper limit of the bottom edge of the shade is adjustable without de-tensioning the spring-operated shade retraction mechanism. In particular, the spring (not shown) of the spring-operated shade retraction mechanism is tensioned by axially rotating roller tube 3 in the direction of lowering the shade and de-tensioned by causing roller tube 3 to axially rotate in the direction raising the shade.

In operation, because axially driven element 40 is keyed to support tube 1 and co-w rotates with roller tube 3, raising the shade causes axially driven element 40 to move axially towards the stop element 50 along the threaded shaft 30. In a similar fashion, lowering the shade causes axially driven element 40 to move axially away from stop element 50.

Figure 6:
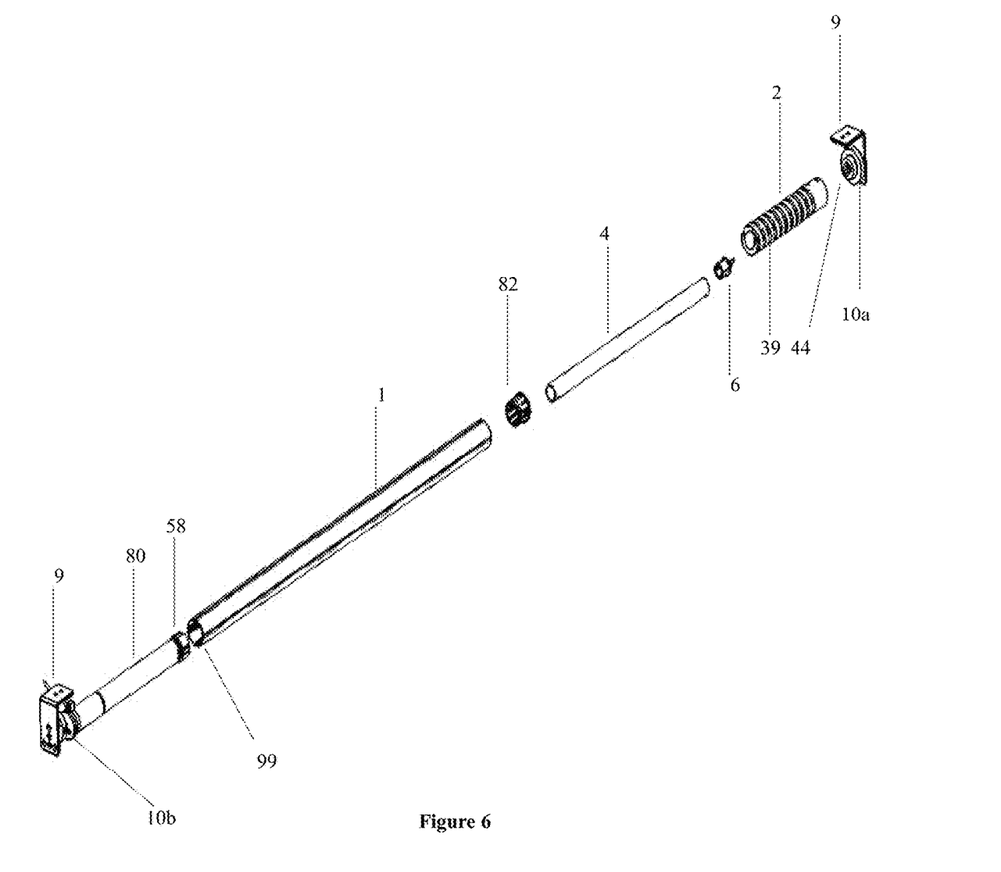
FIG. 6 is a perspective view of certain components of a motorized version of roller shade assembly according to another embodiment of the invention.

As seen in FIG. 6, in one embodiment the roller shade is operated by a motorized drive system 80 which is configured for axially rotating the support tube 1. The motorized drive system includes a motor (not specifically shown) operatively connected to an axially rotatable drive shaft (not specifically shown) and an axially rotatable coupling element 58 which is co-rotationally linked to support tube 1 for co-rotation therewith. In particular, the surface of coupling element 58 has a surface profile which is complimentary to internal ribs 99 in support tube 1. In the embodiment shown in FIG. 6, coupling element 58 is configured to axially rotate support tube 1. Coupling element 58 is attached to the drive shaft for co-rotation therewith. Optionally, the motorized drive system includes a tube motor assembly and the motorized drive system 80 is configured to be housed in an axial bore in support tube 1. The motor may be operated by remote control. The upper limit adjustment feature is not required for motorized operation.

Figure 8:
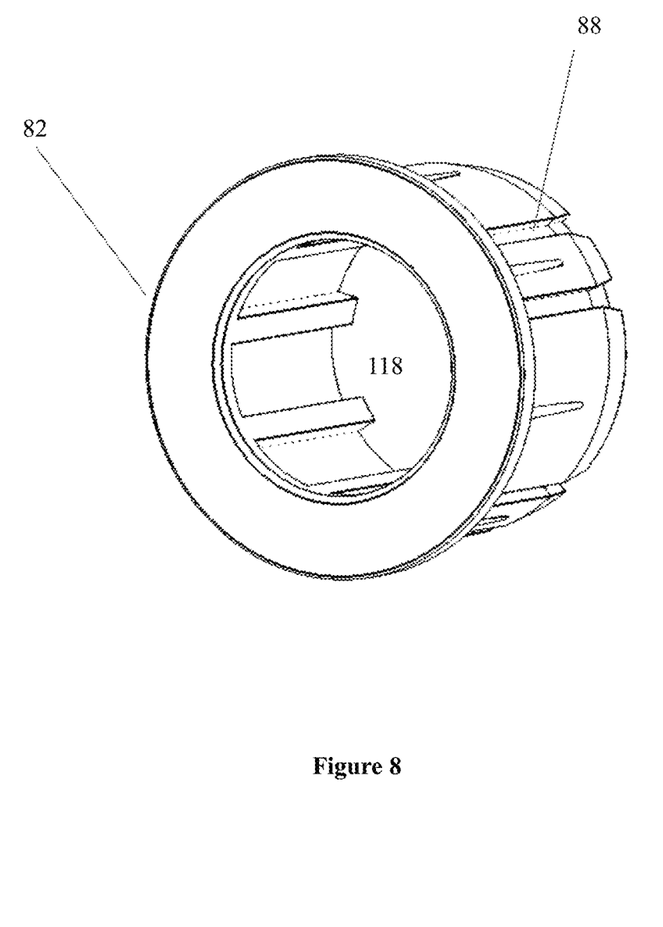
FIG. 8, is a perspective view of a bushing which cooperates with the lateral adjustment feature shown in cross-section in FIG. 7.

As best seen with reference to FIGS. 6, 7 and 8, tube 4 rotates about its axis without resistance within aperture 118 in bushing 82 (not shown in FIG. 9). Bushing 82 comprises grooves 88 which are keyed to internal ribs 99 in support tube 1. Since tube 4 rotates without resistance, it does not co-rotate the support tube and roller tube. Hence, rotation of wheel 10a adjusts the starting axial position of the roller tube 3. Hence wheel 10a can remain affixed to spindle 2 via locking element 14 to adjust the lateral position of the roller tube 3 in relation to the spindle as a result of pin 16 riding in helical groove 39. This moves the roller tube 3 axially without rotating the roller tube 3.

While the principles of this invention have been described in connection with specific embodiments, it should be understood clearly that these descriptions are made only by way of example and are not intended to limit the scope of this invention, in any manner.

The invention claimed is:

1. A roller shade assembly comprising:
   a) A roller tube configured to support a shade, wherein the roller tube is hollow and includes an outer surface for mounting the shade and an inner surface defining an axial bore;
   b) A support tube disposed in the axial bore of the roller tube for receiving and supporting the roller tube, the roller tube and the support tube, in operation, respectively configured for co-rotation and for sliding axial movement of the roller tube on the support tube;

c) A spindle extending axially from a first end of the support tube and configured to be received in the axial bore of the roller tube for axial movement within the axial bore of the roller tube, the spindle including an outer threaded portion defining a helical groove;

d) At least one tracking element operatively associated with the roller tube, the at least one tracking element configured for riding in the helical groove to convert axial rotation of roller tube into axial movement of the roller tube on the support tube, the tracking element engaging the helical groove from a position axially outside the support tube and proximal to one end of the roller tube; and e) A support structure including at least one support shaft assembly for co-axially supporting the support tube and the spindle on a mounting bracket.

2. A roller shade assembly as claimed in claim 1, including a lateral adjustment feature for adjusting a starting axial position of the roller tube in relation to the support tube wherein the spindle is configured to be accessible outside the support tube and rotatable from outside the roller tube while engaging the tracking element and wherein the starting axial position of the roller tube in relation to the support tube is adjustable by manually rotating the spindle without rotating the roller tube.

3. A roller shade assembly as claimed in claim 2, wherein the at least one tracking element is at least one pin that extends radially from the outer surface of the roller tube into the axial bore of the roller tube and into the helical groove.

4. A roller shade assembly as claimed in claim 1, comprising an anti-rotation feature for resisting axial rotation of the spindle in response to axial rotation of the roller tube, the spindle rotationally mounted in relation to the support tube to permit axial rotation of the spindle independently of axial rotation of the support tube, the starting axial position of the roller tube in relation to the support tube configured to be adjustable by manually rotating the spindle from a position external to the support tube without rotating the support tube.

5. A roller shade assembly as claimed in claim 4, wherein the anti-rotation feature comprises a spindle locking element, the lateral starting position of the roller tube on the support tube adjustable by directly rotating the spindle when the locking element is disengaged, engagement of the spindle locking element configured, in operation, to prevent the spindle from rotating when the roller tube is axially rotated such that axial rotation of roller tube is converted into axial movement of the roller tube on the support tube.

6. A roller shade assembly as claimed in claim 5, wherein the spindle locking element is a fastener configured for fastening the spindle to a portion of the support shaft assembly, the fastener connected to the spindle in a location that is axially remote from axial path of travel of the roller tube on the spindle and accessible when the roller shade assembly is supported on the mounting bracket.

7. A roller shade assembly as claimed in claim 1, including an upper limit adjustment feature configured to adjust the upper limit of the bottom edge of the shade.

8. A roller shade assembly as claimed in claim 7, wherein the upper limit of the bottom edge of the shade is adjustable without adjusting the lateral starting position of the roller shade on the support tube.

9. A roller shade assembly as claimed in claim 7, wherein the upper limit of the bottom edge of the shade is adjustable without rotating the roller tube.

10. A roller shade assembly as claimed in claim 7, wherein the upper limit adjustment features include:

a) an actuator;

b) a threaded shaft configured to rotate axially when driven by the actuator;

c) a stop element positioned proximal to one end of the threaded shaft; and d) an internally threaded axially driven element driven by axial rotation of the threaded shaft, the axially driven element, in operation of the roller shade, configured to move axially towards the stop element along the threaded shaft, as the shade is raised, the actuator operable to modify the distance of the axially driven element to the stop element, the modified distance in turn defining a modified maximum number of revolutions of the roller tube.

11. A roller shade assembly as claimed in claim 10, wherein the actuator is an axially rotatable wheel that is configured to be manually rotatable when the roller shade assembly is mounted on the mounting bracket.

12. A roller shade assembly as claimed in claim 11 comprising an anti-rotation feature for resisting axial rotation of the spindle in response to axial rotation of the roller tube, wherein the anti-rotation feature is a spindle locking element and wherein the spindle locking element is configured to be fastened to the axially rotatable wheel.

13. A roller shade assembly as claimed in claim 1, wherein the support shaft assembly includes a spring-operated shade retraction mechanism.

14. A roller shade assembly as claimed in claim 7, wherein the support shaft assembly includes a spring-operated shade retraction mechanism and wherein the upper limit of the bottom edge of the shade is adjustable without de-tensioning the spring.

15. A roller shade assembly as claimed in claim 1, wherein the exterior surface of the support tube comprises at least one longitudinally-oriented channel extending across at least a portion of the exterior of the support tube, and wherein the inner surface of the roller tube includes at least one slidable element configured to ride linearly in the channel to guide axial movement of the roller tube on the support tube.

16. A roller shade assembly as claimed in claim 1, including a lateral adjustment feature for adjusting a starting axial position of the roller tube in relation to the support tube, the lateral adjustment feature configured to adjust the starting axial position of the roller tube in relation to the support tube by rotating the spindle without adjusting an upper limit of movement of a bottom end of the shade.

17. A roller shade assembly as claimed in claim 16, wherein the coupling feature is a spindle locking element, the starting axial position of the roller tube on the support tube adjustable by rotating the spindle when the spindle locking element is disengaged, engagement of the spindle locking element configured, in operation, to prevent the spindle from rotating when the roller tube is axially rotated such that axial rotation of roller tube is converted into axial movement of the roller tube on the support tube, disengagement of spindle locking element concomitantly serving to uncouple rotation of the spindle from rotation of threaded shaft.

18. A roller shade assembly as claimed in claim 1, wherein in operation, the spindle is organized to extend axially from one end of the roller tube when the shade is raised and wherein the roller tube moves laterally over the spindle to progressively cover the spindle when the shade is lowered.

19. A roller shade assembly as claimed in claim 16, wherein the lateral adjustment feature includes a disengageable coupling feature for linking the spindle and the threaded shaft for co-rotation, disengagement of the coupling feature uncoupling rotation of the spindle and the threaded shaft.

* * * * *